Dec. 29, 1925.
C. HOARD
1,567,595
SILO
Original Filed March 15, 1924    2 Sheets-Sheet 1
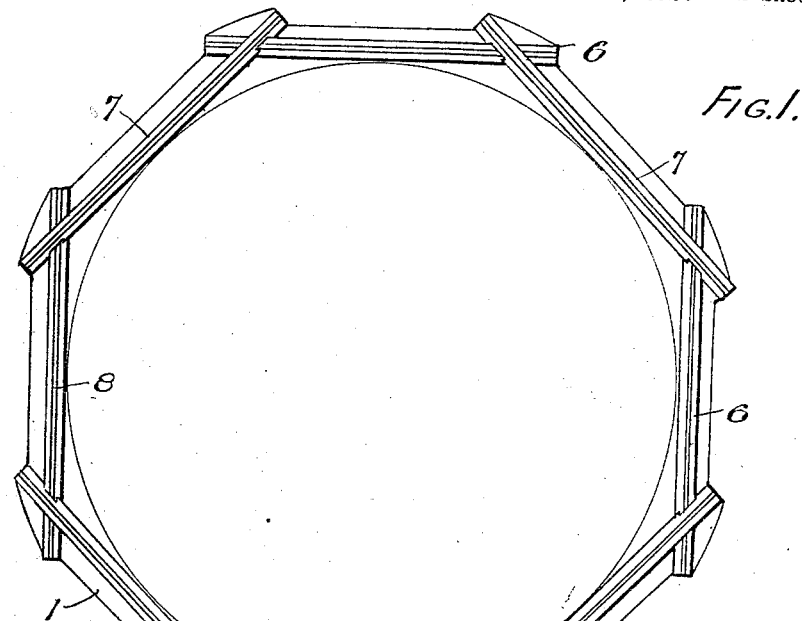
Fig. 1.
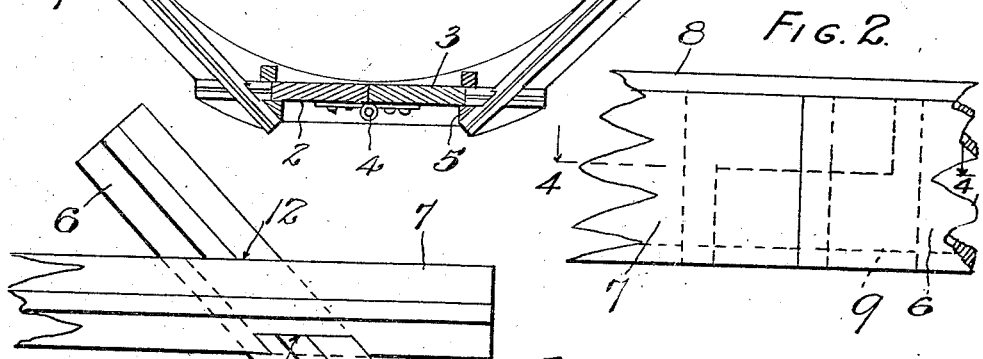
Fig. 2.
Fig. 3
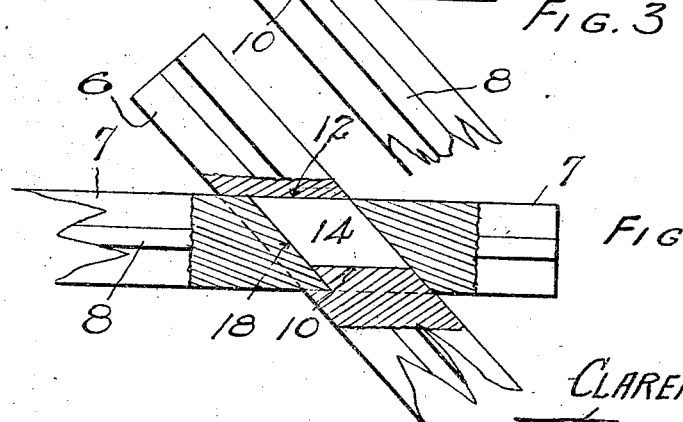
Fig. 4.
Inventor
CLARENCE HOARD
Thomas R. Harney
Attorney Dec. 29, 1925.

C. HOARD

SILO 1,567,595

Original Filed March 15, 1924    2 Sheets-Sheet 2

Inventor
CLARENCE HOARD
Thomas R. Harney
Attorney

Patented Dec. 29, 1925.

1,567,595

UNITED STATES PATENT OFFICE.

CLARENCE HOARD, OF VICTORIA, BRITISH COLUMBIA, CANADA.

SILO.

Application filed March 15, 1924, Serial No. 699,564. Renewed June 15, 1925.

*To all whom it may concern:*

Be it known that I, CLARENCE HOARD, a citizen of the United States of America, residing at Victoria, in the county of Victoria, British Columbia, Canada, have invented certain new and useful Improvements in Silos, of which the following is a specification.

My present invention relates to silos and similar wooden building structures for storing ensilage grain and various other things, but it is especially directed to the construction of a silo or storage bin made up of short lengths of lumber or timber for the purpose of reducing the cost of construction and enhancing the efficiency of the silo.

In the erection and construction of the silo according to my invention I utilize short lengths of lumber or timber which are usually treated as waste material in the mills, and thus not only prevent waste of material, but also reduce the cost of erection of the silo.

According to my invention the material to be used in the silo can be cut to standard sizes and properly fashioned at the mill, for future assembly and erection on the farm or at other desirable places, without the necessity for employing skilled labor.

A strong self-sustained structure of polygonal shape is built up from the prepared material, and while the number of sides of the silo may be varied I have found it desirable to construct the silo with eight sides as herein illustrated.

The invention contemplates the use of complementary, intersecting timbers arranged in courses which courses are made up of pairs of standard length and fashioned or cut with interlocking joints at their respective ends. The joints are arranged in such manner as to divert the movement of air currents therethrough and by thus preventing direct passage of air through the joint increase the distance of air travel through the wall of the silo and therefore the structure is rendered more air tight, while the natural expansion of the timbers is compensated for and utilized for the purpose of tightening the joints of the wall structure.

In the accompanying drawings I have illustrated one complete example of the physical embodiment of my invention wherein the parts are combined and arranged in accordance with the best mode I have thus far devised for the practical application of the principles of my invention, but it will be understood that changes and alterations may be made in the exemplified structure without departing from the spirit of my invention and within the scope of my appended claims.

Figure 1 is a plan view of a silo, with the top omitted, and constructed according to my invention.

Figure 2 is an enlarged view in elevation at a joint between timbers.

Figure 3 is a top plan view showing a timber joint.

Figure 4 is a horizontal sectional view at line 4—4 of Figure 2.

Figure 5:
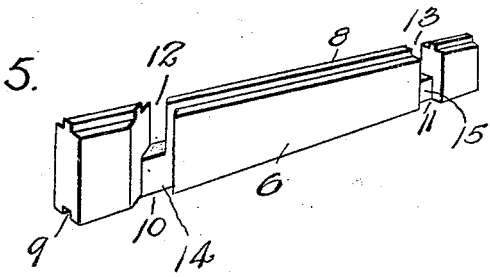
Figure 5 is a perspective view of one of the timbers and Figure 6 is a perspective view of a complementary timber which timbers are joined in pairs in a horizontal course.

For convenience of illustration I have indicated in Figure 1 a conventional form of base or circular foundation as 1 which may be of concrete or similar material, or any other desirable form of base or foundation may be utilized to support the silo erected thereon.

In the form of the invention herein shown a structure of eight sides is illustrated, and in one of these sides a conventional form of door is shown comprising hinged sections 2 and 3 with a hinge 4 and retained within the door frame 5 in any suitable manner to give necessary access to the interior of the silo.

The timbers 6 and 7 are used in pairs to form horizontal courses, and each of these intersecting timbers is fashioned with a tongue 8 and complementary groove 9 in order that the courses may be locked together and a sealed joint be formed between the courses.

Figure 6:
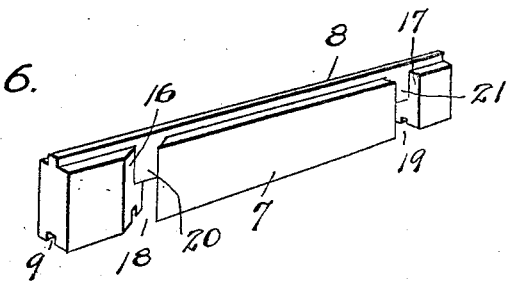

For interlocking the intersecting timbers they are cut out near their respective ends, as best illustrated in Figures 5 and 6, where the timber 6 is shown with two vertical grooves 10 and 11 of a width sufficient to receive the thickness of the complementary timber. These grooves have their walls on angular lines, in this instance at an angle of forty five degrees, and the walls of the spaced grooves are on converging lines The grooves extend vertically from top edge to bottom edge of the timber and are cut in the inner face thereof. The timber is also fashioned with transverse notches as 12 and 13 less than the full thickness of the complementary timber and the notches extend downwardly from the upper or tongue edge of the timber to form tenons 14 and 15 at the lower or grooved edge of the timber.

The timber 7 is fashioned with complementary vertical grooves 16 and 17 on its inner face of a width to receive the full thickness of a complementary timber and the walls of these grooves are disposed at angles of forty five degrees and on converging lines.

Upwardly extending notches 18 and 19 are cut across the lower edge of the timber 7 to form, together with the grooves 16 and 17, tenons 20 and 21.

It will be apparent, after the timbers 6 have been placed in spaced relationship, that the four complementary timbers 7 are slipped over them with the notches 18 and 19 and grooves 16 and 17 fitting over the complementary cut away parts of the four timbers 6, the tenons of the respective timbers being brought together, and the upper and lower faces or edges of the timbers forming a flush and continuous edge around the silo as indicated in the drawings.

This close association of the parts of the intersecting timbers at their joints eliminates the possibility of direct travel of air through the silo wall at the joints and affords a practically air tight joint which is braced against relative movement of the timbers and the joint is arranged in such manner that any lateral swelling will result in tightening the joint and render the wall more durable and efficient.

Figure 7:
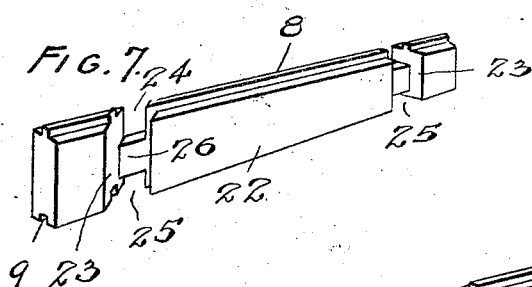
Figures 7 and 8 are perspective views of a complementary pair of timbers slightly modified in their joint structures.
Figure 8:
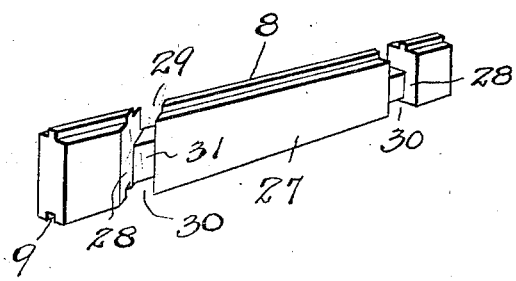

In Figures 7 and 8 the pair of timbers are both cut away or notched on both their upper and lower edges, and grooved on their inner faces similar to the pair of timbers in Figures 5 and 6, for the purpose of permitting the timbers to be interlocked in staggered formation.

Thus the timber 22 is fashioned near each end at its inner side with a vertical groove 23 and upper and lower notches 24 and 25 respectively to form the notch 26.

The complementary timber 27 is also fashioned with spaced vertical grooves 28 of a width to receive the thickness of a complementary timber, and this timber 27 is fashioned with upper and lower notches 29 and 30 respectively to form the tenon 31 in connection with the groove 28. The walls of the spaced grooves and notches are also disposed at angles and on converging lines.

In assembling the course during the erection of the silo the right end of timber 22 is slipped over the left end of the complementary timber 27 to interlock the grooved and notched portions.

When the number of timbers in a course is varied to increase or diminish the number of sides to the silo, the angles at which the walls of the grooves and notches are disposed are of course changed to conform to the angular disposition of the intersecting timbers.

Having thus fully described my invention, what I claim as new and desire to secure by Letters Patent is:

1. In a silo, a series of intersecting timbers forming a horizontal course, each of said timbers having a pair of spaced vertical grooves at its inner side having their walls disposed on converging lines and transversely extending notches at one edge of said timber merging with said grooves to form tenons.

2. A silo timber having spaced vertical grooves therein with their walls on converging lines, and upper and lower notches in said timber merging with said grooves to form tenons in the timber.

In testimony whereof I have affixed my signature.

CLARENCE HOARD.